United States Patent
Chaouch et al.

(10) Patent No.: US 11,778,354 B2
(45) Date of Patent: *Oct. 3, 2023

(54) NETWORK DEVICE WITH INTEGRATED OPTICAL LINE SYSTEM

(71) Applicant: Arista Networks, Inc., Santa Clara, CA (US)

(72) Inventors: Hacene Chaouch, Tucson, AZ (US); Andreas Bechtolsheim, Portola Valley, CA (US); Hugh Holbrook, Palo Alto, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,769

(22) Filed: May 16, 2022

(65) Prior Publication Data

US 2022/0279256 A1    Sep. 1, 2022

Related U.S. Application Data

(63) Continuation of application No. 17/194,062, filed on Mar. 5, 2021, now Pat. No. 11,356,754.

(60) Provisional application No. 62/986,750, filed on Mar. 8, 2020.

(51) Int. Cl.
*H04Q 11/00* (2006.01)
*H04B 10/038* (2013.01)

(52) U.S. Cl.
CPC ....... *H04Q 11/0005* (2013.01); *H04B 10/038* (2013.01); *H04Q 2011/0043* (2013.01)

(58) Field of Classification Search
CPC .......................... H04Q 11/0005; H04B 10/038
See application file for complete search history.

(56) References Cited

U.S. PATENT DOCUMENTS

| | | |
|---|---|---|
| 7,787,772 B2 | 8/2010 | Ota |
| 8,300,659 B2 | 10/2012 | Hinderthuer |
| 9,571,201 B2 | 2/2017 | Iizuka |
| 9,819,416 B2 | 11/2017 | Elahmadi et al. |
| 10,797,789 B2 | 10/2020 | Hu et al. |
| 10,892,828 B2 | 1/2021 | Soto et al. |

(Continued)

OTHER PUBLICATIONS

International Search Report and Written Opinion for International Appln. No PCT/US2021/021381 dated Jun. 11, 2021, 16 pages.

(Continued)

*Primary Examiner* — Shi K Li
(74) *Attorney, Agent, or Firm* — Fountainhead Law Group P.C.

(57) ABSTRACT

Embodiments of the present disclosure include a pluggable optical line system module for amplification, multiplexing, and demultiplexing of coherent optical signals that can be integrated with a switch-router. Integration may include mechanical, electrical, and software control aspects. One example embodiment of the optical line system is in an industry standard small form factor pluggable module such as OSFP (octal small form factor pluggable) or QSFP (quad small form factor pluggable). When configured in a switch-router, the pluggable optical line is powered, managed and controlled by the switch-router which greatly reduces the cost, space, power and the management complexity of optical line systems.

20 Claims, 4 Drawing Sheets

(56) References Cited

U.S. PATENT DOCUMENTS

| | | |
|---|---|---|
| 11,079,559 B2 | 8/2021 | Leclair et al. |
| 2017/0279533 A1 | 9/2017 | Elahmadi et al. |
| 2020/0341218 A1* | 10/2020 | Leclair .................... G06F 1/189 |
| 2021/0239927 A1* | 8/2021 | Rivaud ................ G02B 6/4432 |
| 2021/0281323 A1* | 9/2021 | Williams ........... H04B 10/2971 |

OTHER PUBLICATIONS

PTX5000 and PTX3000 PICs, Juniper Networks, Dec. 2016.

* cited by examiner

NETWORK DEVICE WITH INTEGRATED OPTICAL LINE SYSTEM

CROSS REFERENCE TO RELATED APPLICATIONS

This non-provisional patent application claims the benefit of U.S. patent application Ser. No. 17/194,062 filed on Mar. 5, 2021, which claims the benefit of U.S. Provisional Patent Application No. 62/986,750 filed on Mar. 8, 2020, each of which is incorporated herein by reference in its entirety.

BACKGROUND

The present disclosure relates generally to coherent optical communications networking, and in particular, to network devices with an integrated optical line system.

Dense Wavelength division multiplexing (DWDM) has been used in optical network communications systems and other applications. Essentially, different wavelengths (aka lambdas) of light are used to allow multiple wavelengths to be carried over a single optical fiber. A WDM multiplexer ("mux") is used to couple the different wavelengths into a single fiber. Similarly, a WDM demultiplexer ("demux") is used to separate the wavelengths of light from the fiber.

Optical line systems are building blocks of dense-wavelength-division multiplexed (DWDM) communication systems and provide for the amplification and the multiplexing/demultiplexing of coherent optical signals with different wavelengths. Optical amplification is needed to overcome the transmission losses of the optical signals in the fiber (e.g., across long-distance) and the losses of the optical multiplexing.

Today, optical line systems are typically implemented in dedicated fixed or modular chassis form factor. Each optical line system chassis has dedicated power supplies and control software. In some cases the optical line system chassis also supports transponders.

One problem with today's optical line systems is that they take up a fair amount of space in communication racks and also consume a significant amount of power. Additionally, optical line systems have dedicated management and control software which is typically difficult to use by customers and is also difficult to integrate in an overall network management framework. Accordingly, optical line systems are not currently integrated with the network routing control software of a switch or router, for example. As a result, the routing software cannot take action to perform graceful traffic rerouting of network traffic traversing an optical line system in case of degradation or failures.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions.

DETAILED DESCRIPTION

Described herein are techniques for a networking system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Features and advantages of the present disclosure include network devices with integrated optical line systems that eliminate the need for a separate dedicated chassis for optical line systems altogether and the need for a dedicated CPU controller providing configuration and control for the optical line system. Thus, an integrated optical line system as described herein greatly reduces the cost, space, and power required for an optical line system.

In some embodiments, an optical line system may be reduced in size and packaged in an industry standard small form factor pluggable module, such as OSFP (octal small form factor pluggable) or QSFP (quad small form factor pluggable). An optical line system that is size reduced to such a small pluggable form factor can then be plugged into any matching port of a network device (e.g., a switch or router port), where it may receive power and configuration commands from the network device, for example.

In some example embodiments, extra pluggable ports may be added to a switch-router system that are only connected to the switch-router control plane, but not connected to the switch-router data plane. This allows optical line systems in the form factor of pluggable optics modules to be added to a network device without occupying an actual switch-router network facing port. In embodiments, at least one of the extra pluggable ports connected only to the switch-router control plane is a dedicated switch-router port into which a pluggable optical line system module is plugged. This dedicated switch-router port includes connections to a power source and to the control plane but includes no connection to a data plane of the switch-router.

As mentioned above, features and advantages of the various embodiments of the present disclosure may include a potentially significant reduction in cost and power by eliminating the need for a separate optical line system chassis. Features of some embodiments may include the simplification of using the network device control plane, such as a switch or router control plane, for example, to configure the parameters of the optical line system, avoiding the need for a separate optical line system control plane CPU and software. Additionally, some embodiments provide the switch or router with visibility into the state of the optical line system which, for example, may enable the routing control plane to gracefully change network traffic routing upon early failure detection in the optical line system. For example, in one embodiment optical control software running on the switch-router monitors the state of the pluggable optical line system module and, upon detecting an indication of failure, reroutes network traffic over alternative paths. In embodiments, the control plane monitors a state of the pluggable optical line system modules and detects conditions that affect performance of these pluggable optical line system modules. Upon detecting a failure of one or more of the pluggable optical line system modules, the control plane reconfigures traffic forwarding tables to route network traffic over alternative paths to thereby bypass the failure of the one or more pluggable optical line system modules.

Figure 1:
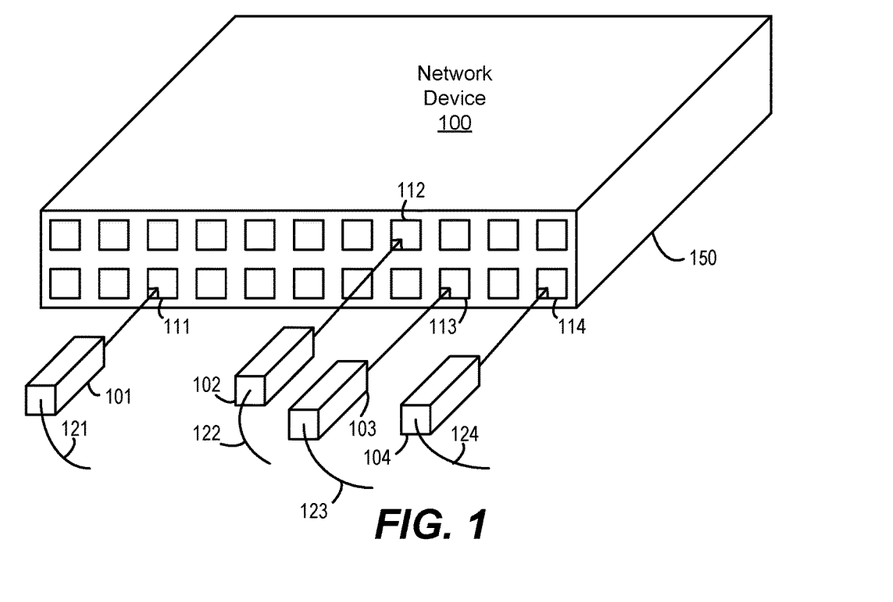
FIG. 1 illustrates a network device including an integrated optical line system according to various embodiments.

FIG. 1 illustrates a network device 100 according to an embodiment. Network device 100 may be a network switch, network router, or combined switch-router (e.g., a layer2/layer 3 switch-router), for example. In one embodiment, network device 100 includes a chassis 150 and a plurality of network ports, such as network ports 111-114, for example, which support a plurality of pluggable optical transceiver modules, such as modules 101-104. Network ports 111-114 may be advantageously configured to receive different types of optical modules, including data-center optics and digital coherent optical modules. In addition, optical modules may include a pluggable optical line system module having first and second optical transceiver ports for sending and receiving optical data communications signals. A pluggable optical line system module may provide an interface for DWDM optical signals between one or more coherent optical modules and fiber optic lines coupled to another network device (e.g., in another data center), respectively. Accordingly, a pluggable optical line system module may include first and second optical amplifiers, for example, configured to receive and transmit multiple coherent optical signals (e.g., multiple DWDM optical lambdas). Advantageously, a pluggable optical line system module may use any one of the same network ports as the conventional optics modules, which may be configured to send and receive data to and from the network device 100, for example. The pluggable modules and ports may utilize an industry standard form factor, such as OSFP (octal small form factor pluggable) or QSFP (quad form factor pluggable), for example, which are known to those skilled in the art. One example type of optical module that may be used with an optical line system module in ports 111-114 is a 400 G ZR digital coherent optics module, for example, which may receive data from network device 100 and send the data out on an optical output as well as receive data on an optical input and send data to the network device 100, for example.

Figure 2A:
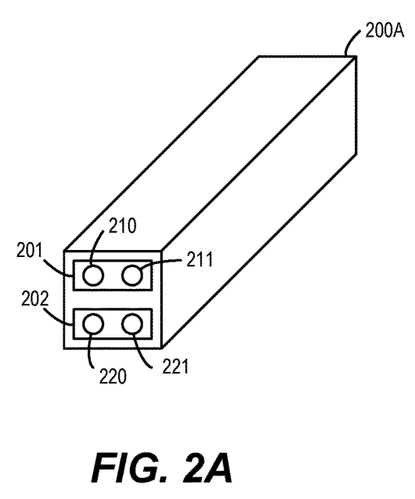
FIG. 2A illustrates a pluggable optical line system module according to an embodiment.

FIG. 2A illustrates a pluggable optical line system module 200A according to an embodiment. In this example, pluggable optical line system module 200A includes first and second optical interfaces 201 and 202. Interface 201 may be for sending and receiving combined optical inputs from one or more local network devices as mentioned above (e.g., client optical signals), and the other interface 202 may be for sending and receiving optical signals over longer distances (e.g., "line signals" between data centers). Interface 201 (e.g., client facing physical interface) may comprise an optical input port 210 to receive optical signals (e.g., from one or more network devices, or "clients") and an optical output port 211 to transmit optical signals (e.g., to one or more network devices, or "clients"), for example. Similarly, interface 202 (e.g., line facing physical interface) may comprise an optical line input port 220 to receive optical line signals and an optical line output port 221 to transmit optical line signals, for example. Ports 210, 211, 220, and 221 may be fiber ports for receiving mechanical fiber optic connectors.

Figure 2B:
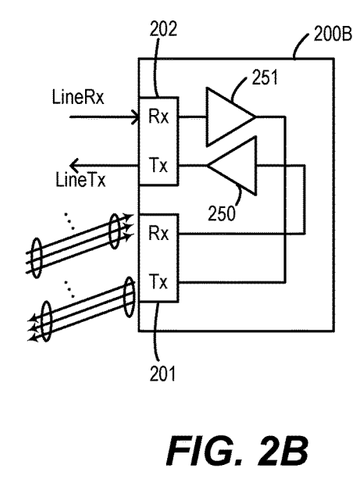
FIG. 2B is a schematic diagram of the pluggable optical line system module of FIG. 2A according to an embodiment.

FIG. 2B illustrates a schematic diagram 200B of pluggable optical line system module 200A according to an embodiment. Schematic 200B illustrates optical interface 201 for sending and receiving optical data communication signals (e.g., from a client network device) and optical interface 202 for sending and receiving optical data communication signals (e.g., across a line to another data center). As illustrated here, an optical line system module includes a first optical amplifier 250 having an input coupled to a receive port of optical interface 201 (e.g., to receive optical signals from one or more clients) and an output coupled to a transmit port of optical interface 202 (e.g., to transmit optical signals to another data center). Further, an optical line system module includes a second optical amplifier 251 having an input coupled to the receive port of optical interface 202 (e.g., to receive optical signals from another data center) and an output coupled to the transmit port of optical interface 201 (e.g., to transmit optical signals to one or more clients). As illustrated in FIG. 2B, interface 201 may be coupled to DWDM optical signals that have been combined from multiple independent optical signals having different wavelengths, such as different ZR signals produced by different ZR optics modules mentioned above, for example. Thus, the client-facing Tx and Rx are illustrated using multiple arrows representing a combination of multiple optical signals, for example.

Figure 3:
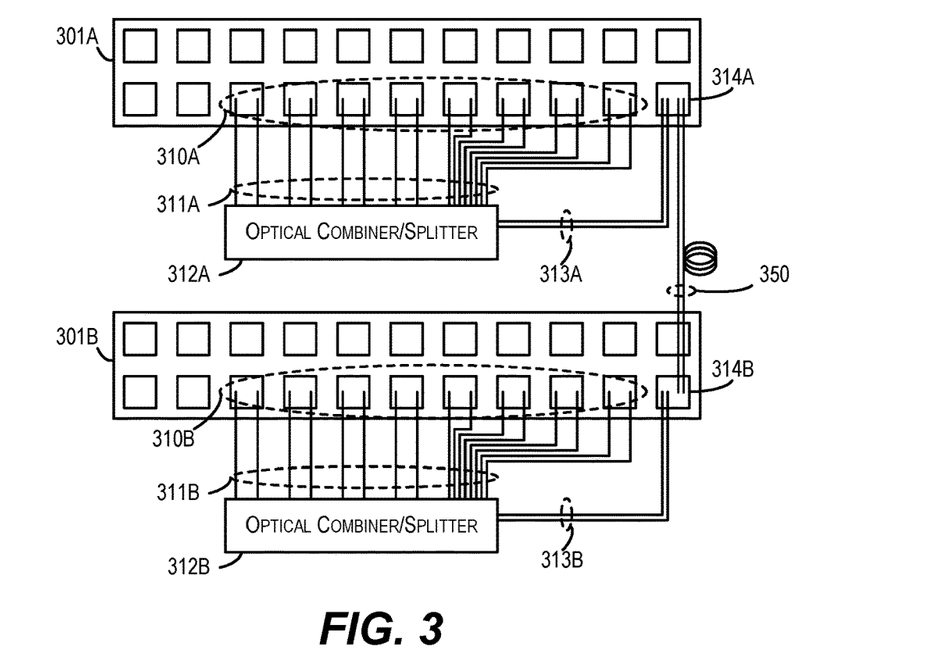
FIG. 3 is a system diagram illustrating an example embodiment of the present disclosure.

FIG. 3 illustrates a system diagram illustrating an example embodiment of the present disclosure. In this example, a first network device 301A (e.g., a switch-router at or above Layer 2) is configured to communicate data over an optical link 350 with a second network device 301B (e.g., another switch-router). Network devices 301A and 301B include a plurality of network ports on a switch-router chassis. Here, coherent optical modules (e.g., 400 G ZR) are plugged into ports designated at 310A. Each coherent optical module may send and receive data from the networking ports of network device 301A. Such data may be sent from and received in the network device 301A over optical cables 311A, where each optical cable either sends or receives one optical signal at a particular wavelength. For example, one coherent optical module plugged into one of the ports 310A may include one optical transmit output coupled to one optical fiber and one optical receive input coupled to one optical fiber, and the coherent optical module may send and receive a particular wavelength on the two optical ports, for example. In this example, an optical combiner/splitter 312A combines optical signals on optical fibers 311A transmitted from each of the coherent optical modules plugged into ports 310A to form one DWDM optical signal. The DWDM signal is coupled to an input of a client interface (e.g., input port 210 of interface 201 in FIG. 2) of a pluggable optical line system module plugged into port 314A. An output interface of the client interface (e.g., output port 211 of interface 201 in FIG. 2) of the pluggable optical line system module plugged into port 314A is coupled to combiner/splitter 312A so that DWDM optical signals may be split and sent to the different coherent optical modules in ports 310A.

DWDM optical signals received in pluggable optical line system module in port 314A may be coupled through an optical amplifier (e.g., optical amplifier 250 in FIG. 2) and transmitted on an optical line output coupled to optical cable 350. The transmit line output of pluggable optical line system module in port 314A is coupled to a receive line input of another pluggable optical line system module in port 314B in network device 301B. Similarly, optical cable 350 includes an optical link between the transmit line output of pluggable optical line system module in port 314B and the receive line input of pluggable optical line system module in port 314A. Similarly, in network device 301B, the client transmit and receive interface of pluggable optical line system module in port 314B is coupled through optical links 313B, optical combiner/splitter 312B, and optical links 311B to coherent optical modules in ports 310B. In this example, a signal network device may be used to both control traffic flow (e.g., through coherent optical modules in ports 310A and/or 310B) and also establish a line connection between remote network devices 301A and 301B, which may be in different data centers separated by long distances, for example. It is to be understood that while the above example illustrates the techniques of the present disclosure for connecting remote data centers, the techniques described herein may also be used to establish connections between network devices within the same data center. Additionally, while the coherent optical modules are illustrated here as all being within the same network device as the pluggable optical line system module, it is to be understood that the coherent optical modules may be in different network devices. One significant advantage of the present disclosure is the ability to connect the pluggable optical line system module to different types of coherent optical modules.

Figure 4:
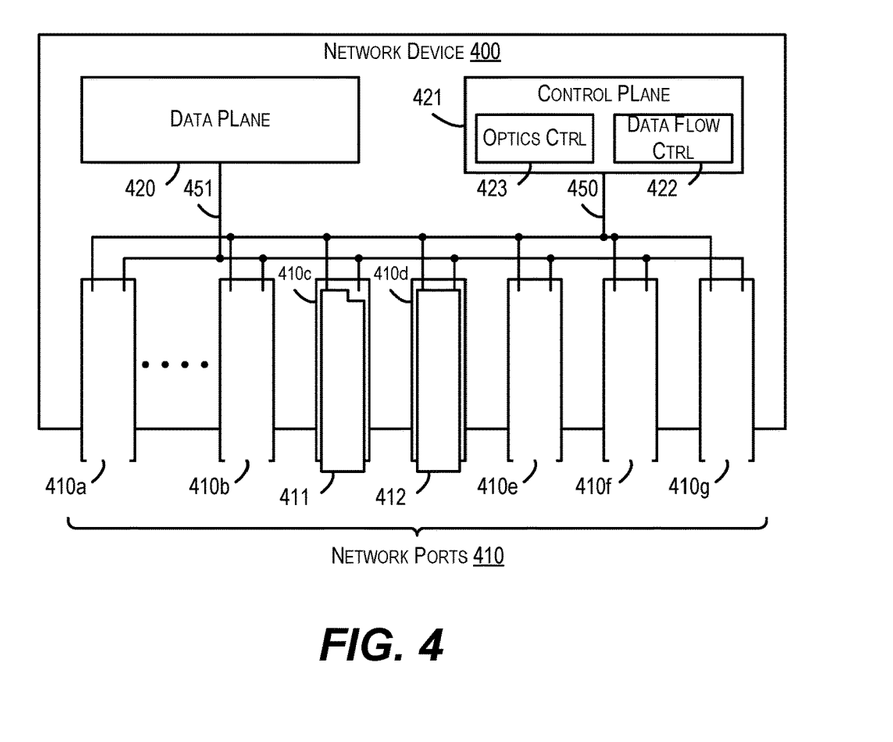
FIG. 4 illustrates coupling pluggable network modules to internal subsystems of a network device according to another embodiment.

FIG. 4 illustrates coupling pluggable network modules to internal subsystems of a network device according to another embodiment. Embodiments of the present disclosure may include pluggable optical line system modules that are electrically coupled to a control plane, but not electrically coupled to a data plane of a network device, for example. In this example, a network device 400 includes a data plane 420 and a control plane 421. Data plane 420 (sometimes known as the forwarding plane) is the part of network device 400 that carries network traffic (e.g., packets), for example. Control plane 421 determines what to do with the traffic (e.g., where to send packets), for example. A subset of the control plane, sometimes referred to as the management plane, may configure, monitor, and manage elements of the system, for example. In this example, data plane 420 is electrically coupled to network ports 410 over electrical connections 451 and control plane 421 is electrically coupled to network ports 410 over electrical connections 450. Here, two optics modules are connected to ports 410c and 410d. Module 411 is a pluggable optical line system module and optics module 412 is another type of pluggable module (e.g., a 400 G ZR optics module). As mentioned above, the pluggable modules may have an industry standard form factor, such as OSFP (octal small form factor pluggable) or QSFP (quad form factor pluggable), for example. In this example, optical module 412 is electrically coupled to the data plane 420 over electrical connections 451 and control plane 421 over electrical connections 450. However, pluggable optical line system module 411 in port 410c is electrically coupled to the control plane 421 over electrical connections 450, but not to the data plane 420. For example, as illustrated in FIG. 4, pluggable optical line system module 411 may include wires that physically contact wires in port 410c to establish electrical connections to the control plane (e.g., via electrical connectors 450), but pluggable optical line system module 411 does not connect to data plane 420 (this is illustrated in FIG. 4 by a square cut out in pluggable optical line system module 411).

In some embodiments, the control plane 421 determines a pluggable module type and executes different algorithms based on the module type. For instance, if the pluggable module is a pluggable optical line system module, the control plane 421 may execute one or more optics control algorithms 423 (e.g., optical control software), which may configure, monitor, and/or manage pluggable optical line system module 411. For example, configuring may include the following. The control plane may recognize the pluggable optical line system module and configure it into a high-power mode. The control plane detects that the pluggable optical line system module port is data-path free and will not route traffic into it. During management, the control plane may continuously monitor components of the pluggable optical line system module, such as the booster amplifier input and output (e.g., amplifier 251 in FIG. 2B) and the pre-amplifier input and output (e.g., amplifier 250 in FIG. 2B). For instance, if the pre-amplifier input is too low (e.g., beyond the pre-amplifier automatic gain control), indicating the fiber loss is higher than expected, the control plane can decide to either increase the booster amplifier output or can report a line side error and decide to shut down the pluggable optical line system module (e.g., shut down the pre-amplifiers). For monitoring, the control plane may read the input and output optical power levels of both the booster amplifier and pre-amplifier. If the booster/pre-amplifiers outputs are degrading over the device lifetime (e.g., compared to an initial time t0), the control plane software can report this to the user as a warning/alarm versus predefined thresholds. Additionally, the control plane can determine if a dark fiber is gradually degrading over time (with the amplifiers staying fine) to a point where the pre-amplifier automatic gain control (e.g., included with the pluggable optical line system module firmware) cannot compensate for the increasing loss. This condition may be detected, for example, when all other amplifier power levels may indicate relatively stable levels except for the pre-amplifier input. This can also be reported as failure mode with its own warning and alarm thresholds that are dynamically set at t0 for a given link loss.

On the other hand, if the pluggable optics module type is another type of pluggable optics module different from a pluggable optical line system module, the control plane may execute one or more data flow control algorithms, wherein packets may flow between the pluggable optics module and data plane 420, for example. In one embodiment, pluggable optical line system module 411 and pluggable module 412 may include a memory (e.g., an EPROM) for storing information specifying a pluggable module type. Accordingly, the control plane 421 may read the pluggable module type from the stored information in memory and execute different control algorithms that correspond to the type of the pluggable module.

It is to be understood that pluggable optical line system module 411 may be plugged into any of ports 410, for example.

Figure 5A:
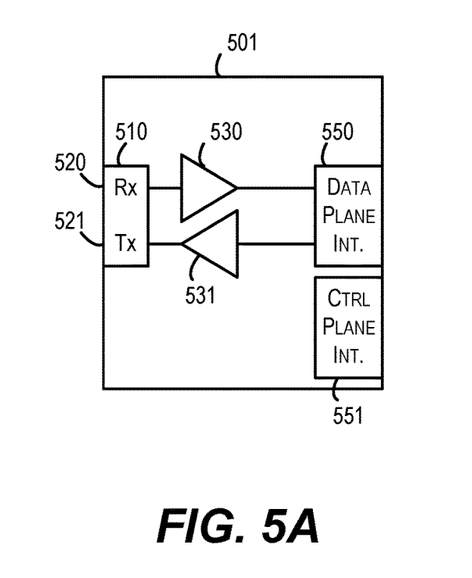
FIGS. 5A-B illustrate simplified schematics of two different types of pluggable modules according to embodiments.
Figure 5B:
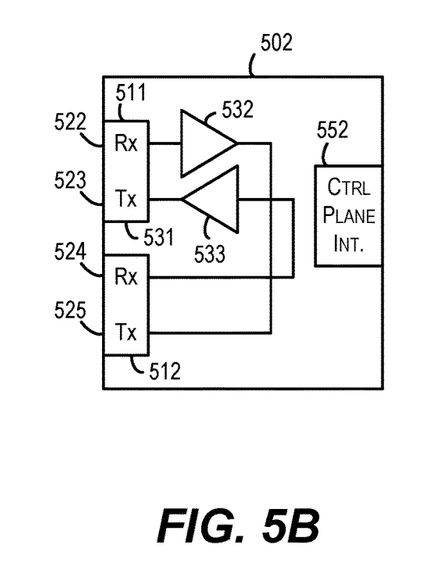

FIGS. 5A-B illustrate simplified schematics of two different types of pluggable modules. The two pluggable modules may have the same form factor to plug into the same ports, for example. Pluggable optics module 501 in FIG. 5A illustrates a pluggable optics module that sends and receives data between an optical interface and a data plane of a network device, for example. Pluggable optics module 501 may include an optical interface 510 comprising a receive port 520 and transmit port 521. Receive port 520 is coupled to an input of an optical amplifier 530, and an output of the optical amplifier 530 is coupled to a data plane interface 550. Data plane interface 550 is coupled to an input of optical amplifier 531, and an output of optical amplifier 531 is coupled to transmit port 521. Pluggable optics module 501 further includes a control plane interface 551 for communicating with a control plane, for example.

FIG. 5B illustrates a pluggable optical line system module 502, which sends and receives data between optical interfaces. For instance, pluggable optical line system module 502 may include an optical interface 511 comprising a receive port 522 and transmit port 523. Receive port 522 is coupled to an input of an optical amplifier 532, and an output of the optical amplifier 532 is coupled to transmit port 525 of optical interface 512. Similarly, receive port 524 of optical interface 512 is coupled to an input of an optical amplifier 533, and an output of the optical amplifier 533 is coupled to transmit port 523 of optical interface 511. Optical interface 511 may be a client facing interface, for example, and optical interface 512 may be a line facing interface. Pluggable optical line system module 502 may include an electrical interface 552 to a control plane (e.g., control plane 421 in FIG. 4) for allowing the control plane to configure, monitor, and manage pluggable optical line system module 502, for example. One distinction between pluggable optics modules 501 and 502 is that optics module 501 may send and receive data with a network device it is plugged into, whereas pluggable optical line system module 502 may use the same control plane as optics module 501, but not use the data plane. Accordingly, a single network device may perform data forwarding through the data plane and optical line reception and transmission using a pluggable optical line system module 502. The network device may further provide power to both modules 501 and 502, and a single control plane may determine the type of pluggable module and perform different control algorithms based on the module type to manage different types of modules, including a pluggable optical line system module 502.

Figure 6:
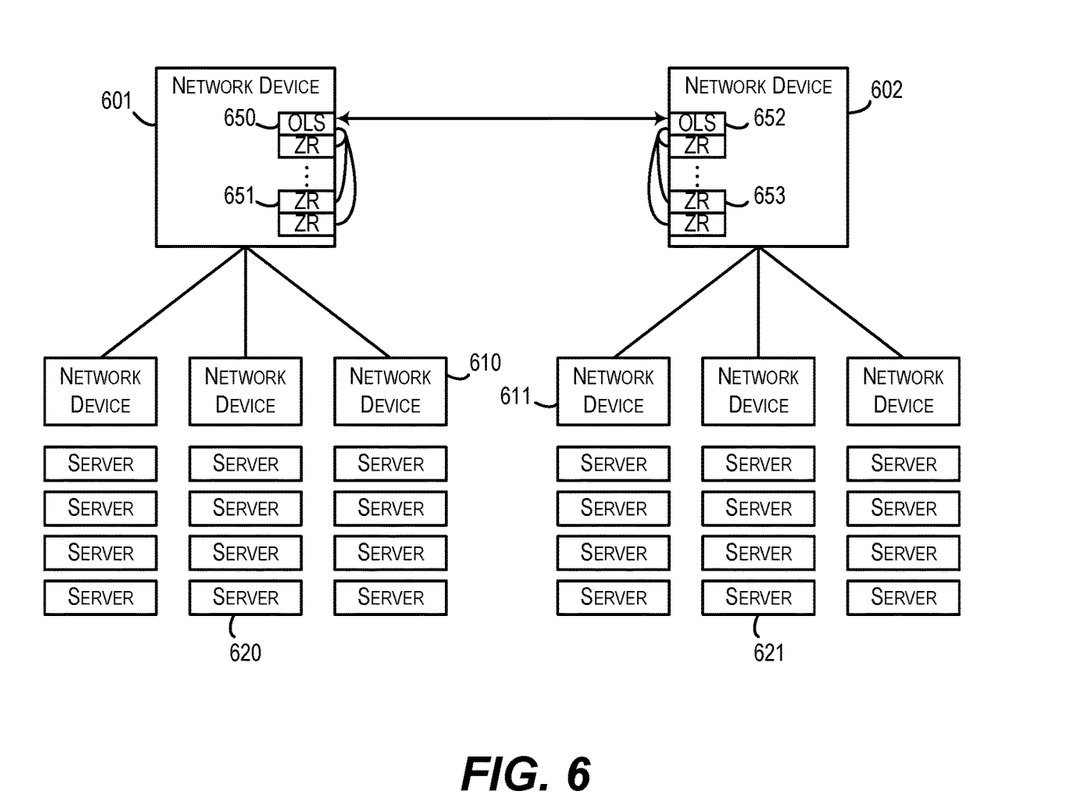
FIG. 6 illustrates an application of a pluggable optical line system module according to an embodiment.

FIG. 6 illustrates an application of a pluggable optical line system module according to an embodiment. As mentioned above, in some example implementations, embodiments of the present disclosure may be used to establish data communication links over long distances between data centers. In this example, a plurality of computer servers, such as server 620 are coupled to a plurality of network devices, such as network device 610 (e.g., switches and/or routers) in a data center. Similarly, in another data center, a plurality of computer servers, such as server 621 are coupled to a plurality of network devices, such as network device 611. Features and advantages of the present disclosure allow data communication between data centers using a single network device in each data center. In this example, network traffic may be sent to network device 601 (e.g., a layer 3 switch-router), which converts the data from electrical signals to optical signals at different wavelengths (colors) using pluggable ZR modules, such as pluggable module 651. Optical signals on a plurality of ZR modules may be combined (combiner not shown) and provided as an input to pluggable optical line system (OLS) module 650, which transmits a DWDM optical signal to network device 602. Network device 602 receives the DWDM optical transmission in a pluggable OLS module 652 and sends the optical signals to ZR modules 653 (splitter not shown). The ZR modules may translate the optical signals into electrical signals, for example, which may be forwarded around network devices, such as device 611 and servers, such as server 621. Data from servers 621 may be sent to servers 620 using the same process in reverse, for example.

Figure 7:
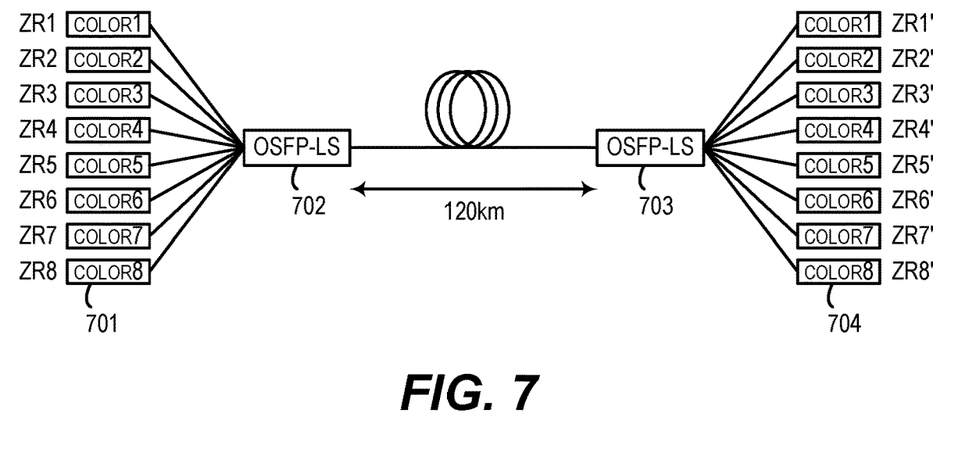
FIG. 7 illustrate the combining of multiple ZR optical signals, transmission using a pluggable optical line system module, reception using a pluggable optical line system module, and splitting of the multiple ZR optical signals according to an embodiment.

The combining of multiple ZR optical signals, transmission using a pluggable optical line system module, reception using a pluggable optical line system module, and splitting of the ZR optical signals is illustrated in FIG. 7. Each ZR module, such as module 701 may be plugged into the same network device chassis as pluggable optical line system module 702. In this example, modules 702 and 703 may have OSFP form factors. The line length may be 100 km or longer, for example.

Figure 8:
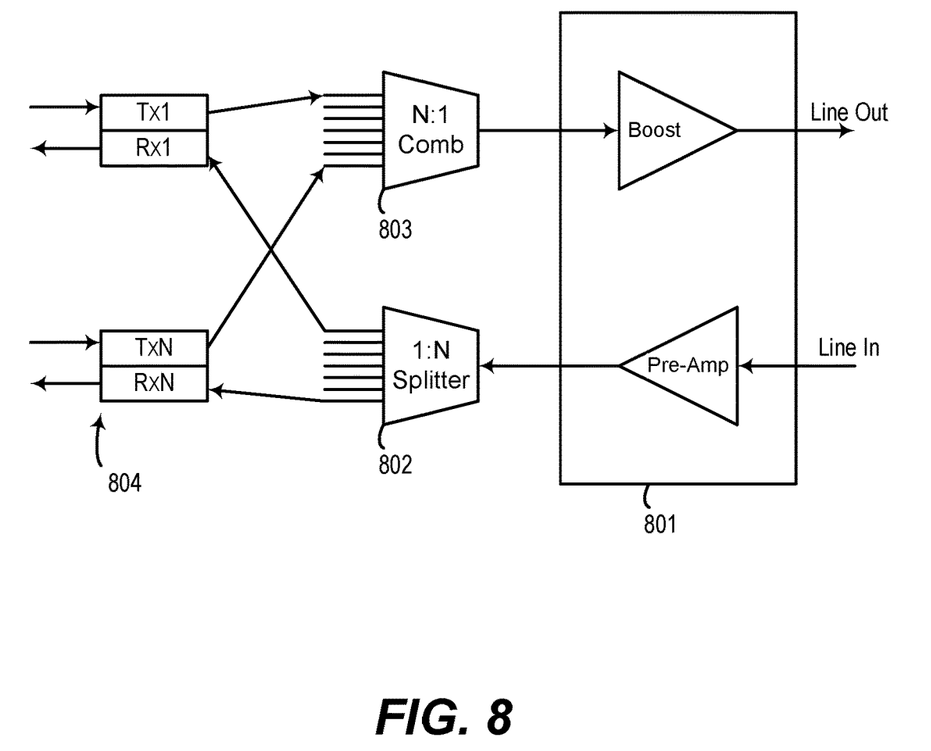
FIG. 8 illustrates a pluggable optical line system module including an optical pre-amplifier coupled to a 1:N splitter and including an optical boost amplifier coupled to an N:1 combiner according to an embodiment.

FIG. 8 illustrates an example according to an embodiment. Here, pluggable optical line system module 801 includes an optical pre-amplifier and an optical boost amplifier coupled to line in and line out, respectively. The output of the pre-amplifier is coupled to a 1:N splitter, which splits optical lambdas and forwards different lambdas to receive interfaces of pluggable optics modules in one or more clients. Pluggable optics modules also send optical signals to an N:1 combiner 803, through optical boost amplifier, and to line out.

Further Examples

Each of the following non-limiting examples may stand on its own, or may be combined in various permutations or combinations with one or more of the other examples.

Example 1 is a network device comprising: a switch-router configured to forward packets at Layer 2 or above, the switch-router comprising a control plane coupled to a plurality of switch-router ports; and a pluggable optical line system module that provides bidirectional optical amplification plugged into one of the switch-router ports, wherein said pluggable optical line system module is coupled to and configured by the control plane of the switch-router.

Example 2 is a pluggable optical line system module comprising: a first optical interface for sending and receiving one or more dense wavelength division multiplexed (DWDM) signals; a second optical interface for sending and receiving one or more dense wavelength division multiplexed (DWDM) signals; a first optical amplifier having an input coupled to an optical receive port of the first optical interface and an output coupled to an optical transmit port of the second optical interface; a second optical amplifier having an input coupled to the optical receive port of the second optical interface and an output coupled to the optical transmit port of the first optical interface; and a control plane interface configured to communicate with a control plane of a switch-router that manages the operation of said pluggable optical line system module.

Example 3 is a network device comprising: a switch-router configured to forward packets at or above a Layer 2, the switch-router comprising a control plane coupled to a plurality of switch-router ports, wherein the switch-router comprises a non-transitory computer-readable storage medium coupled to the control plane having stored thereon computer executable instructions, which when executed are operable for: detecting a module inserted into one of said switch-router ports; determining if a module type is a pluggable optical line system module; and when the module type is a pluggable optical line system module, configuring the pluggable optical line system module.

Example 4 is a network device comprising: a switch-router configured to forward packets at Layer 2 or above, configured with one or multiple pluggable optical line system modules in one or more switch-router ports, wherein a switch-router control plane monitors a state of the one or multiple optical line system modules and detects conditions that affect performance of the one or multiple pluggable optical line system modules, and upon detecting conditions that affect a performance of the optical line system modules, reconfigures traffic forwarding tables to route network traffic over alternative paths to bypass corresponding ones of the pluggable optical line system modules.

Example 5 is a network device comprising: a switch-router configured to forward packets at Layer 2 or above, the switch-router comprising a plurality of switch-router ports; and a pluggable optical line system module that provides bidirectional optical amplification plugged into one of the switch-router ports, wherein said pluggable optical line system module is coupled to receive power through the switch-router port.

In some embodiments, the pluggable optical line system module is plugged into a dedicated switch-router port comprising connections to a power source and the control plane but no connection to a data plane in said switch-router.

In some embodiments the control plane determines a module type, and wherein if the module type is said pluggable optical line system module, the control plane executes optical control software.

In some embodiments the pluggable optical line system module is configured and managed by optical control software running on the control plane of the switch-router.

In some embodiments the optical control software on the switch-router monitors the state of the pluggable optical line system module and, upon detecting an indication of failure, reroutes network traffic over alternative paths.

In some embodiments the pluggable optical line system module has an OSFP (Octal Small Form Factor Pluggable) or QSFP (Quad Small Form Factor Pluggable) form factor.

In some embodiments the pluggable optical line system module includes no electrical connection to a data plane of the switch-router.

In some embodiments the pluggable optical line system module has a module type and wherein the control plane communicates through the control plane interface to determine the module type, and wherein, if the control plane determines the module type is the module type of a pluggable optical line system module, the control plane executes optical control software.

In some embodiments the pluggable optical line system module is configured and managed through the control plane interface by optical control software running on the control plane of the switch-router.

In some embodiments the pluggable optical line system module is coupled to receive power through a switch-router port of the switch-router.

In some embodiments the switch-router includes a dedicated port into which the pluggable optical line system module is plugged, and wherein the dedicated port includes electrical connections to a power source and the control plane but includes no electrical connection to a data plane of the switch-router.

In some embodiments the non-transitory computer-readable storage medium further includes instructions which, when executed, are operable to monitor a state of the pluggable optical line system module and, upon detecting an indication of a failure of the pluggable optical line system module, are operable to reroute network traffic through the pluggable optical line system module to alternative paths.

In some embodiments the switch-router control plane executes optical control software in response to detecting one or multiple pluggable optical line system modules is plugged into one or more of the switch-router ports.

In some embodiments the switch-router further comprises a data plane, and wherein the one or multiple pluggable optical line system modules are electrically coupled through the one or more switch-router ports to the switch-router control plane and are not electrically coupled through the one or more switch-router ports to the data plane.

In some embodiments each of the one or more switch-router ports comprises a dedicated switch-router port including electrical connections to a power source.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A network device comprising:
a plurality of I/O (input/output) ports;
a control plane in electrical connection to the plurality of I/O ports;
a data plane in electrical connection to the plurality of I/O ports; and
a pluggable optical line system module plugged into one of the plurality of I/O ports, wherein the pluggable optical line system module includes an interface in electrical connection with the control plane of the network device via said one of the plurality of I/O ports, wherein the pluggable optical line system module is absent an interface for an electrical connection to the data plane of the network device and has no electrical connection to the data plane of the network device when plugged into said one of the plurality of I/O ports.

2. The network device of claim 1, wherein the pluggable optical line system module is in communication with the control plane and is not in communication with the data plane.

3. The network device of claim 1, wherein the pluggable optical line system module is configurable by the control plane.

4. The network device of claim 1, wherein the pluggable optical line system module is configured and managed by optical control software executing in the control plane.

5. The network device of claim 1, wherein the control plane determines a module type, and in response to the module type indicating an optical module, the control plane executes optical control software.

6. The network device of claim 1, wherein optical control software executing in the control plane monitors a state of the pluggable optical line system module and, upon detecting an indication of failure, reroutes network traffic over one or more alternative paths that bypass the pluggable optical line system module.

7. The network device of claim 1, wherein the pluggable optical line system module has an OSFP (Octal Small Form Factor Pluggable) or QSFP (Quad Small Form Factor Pluggable) form factor.

8. A pluggable optical line system module comprising:
a first optical interface to send and receive optical signals;
a second optical interface to send and receive optical signals;
optical amplification circuitry to communicatively couple the first optical interface and the second optical interface; and
a control plane interface to be electrically connected a control plane of a network device when the pluggable optical line system module is plugged into a port of the network device,
wherein the pluggable optical line system module is absent an interface that electrically connects to a data plane of the network device, wherein when the pluggable optical line system module is plugged into any port of the network device there is no electrical connection to the data plane of the network device.

9. The pluggable optical line system module of claim 8, wherein the pluggable optical line system module is in communication with the control plane of the network device when the pluggable optical line system module is plugged into a port of the network device, wherein the pluggable optical line system module is not in communication with the data plane of the network device when the pluggable optical line system module is plugged into any port of the network device.

10. The pluggable optical line system module of claim 8, wherein the optical amplification circuitry comprises:
a first optical amplifier having an input coupled to an optical receive port of the first optical interface and an output coupled to an optical transmit port of the second optical interface; and
a second optical amplifier having an input coupled to the optical receive port of the second optical interface and an output coupled to an optical transmit port of the first optical interface.

11. The pluggable optical line system module of claim 8, wherein the control plane of the network device manages operation of the pluggable optical line system module.

12. The pluggable optical line system module of claim 8, wherein the pluggable optical line system module is configured and managed through the control plane interface by optical control software executing in the control plane.

13. The pluggable optical line system module of claim 8, wherein the pluggable optical line system module communicates with the control plane via its control plane interface, wherein when the control plane determines the pluggable optical line system module is an optical module type, the control plane executes optical control software.

14. The pluggable optical line system module of claim 8, wherein the pluggable optical line system module is coupled to receive power through a port of a switch-router when the pluggable optical line system is plugged into the port of the switch-router.

15. The pluggable optical line system module of claim 8, wherein the pluggable optical line system module has an OSFP (Octal Small Form Factor Pluggable) or QSFP (Quad Small Form Factor Pluggable) form factor.

16. A method in a network device comprising a control plane for monitoring and managing I/O ports of the network device and a data plane for receiving and transmitting packets received by the I/O ports of the network device, the method comprising the control plane:
executing an optics control algorithm in response to a pluggable optical line system module being received in one of the I/O ports of the network device, the optics control algorithm for one or more of: configuring, monitoring, and managing the pluggable optical line system module, wherein the pluggable optical line system module has an electrical connection with the control plane of the network device and has no electrical connection to the data plane of the network device;
monitoring components of the pluggable optical line system module; and
in response to detecting errors or degraded performance among the monitored components, rerouting network traffic over one or more alternative paths that bypass the pluggable optical line system module.

17. The method of claim 16, wherein the pluggable optical line system module is in communication with the control plane and is not in communication with the data plane.

18. The method of claim 16, wherein the monitored components of the pluggable optical line system module include a booster amplifier and a pre-amplifier.

19. The method of claim 16, wherein the monitoring includes the control plane monitoring input and output power levels of the monitored components.

20. The method of claim 16, further comprising the control plane reading information from a memory of the pluggable optical line system module that indicates a type of the pluggable optical line system module, wherein the control plane selects the optics control algorithm based on the type.

* * * * *